(12) United States Patent
Chi

(10) Patent No.: US 9,900,376 B2
(45) Date of Patent: Feb. 20, 2018

(54) METHOD FOR PRESENTING SCHEDULE REMINDER INFORMATION, TERMINAL DEVICE, AND CLOUD SERVER

(71) Applicant: HUAWEI DEVICE (DONGGUAN) CO., LTD., Shenzhen (CN)

(72) Inventor: Haizhang Chi, Shenzhen (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 443 days.

(21) Appl. No.: 14/550,033

(22) Filed: Nov. 21, 2014

(65) Prior Publication Data

US 2015/0120837 A1    Apr. 30, 2015

Related U.S. Application Data

(63) Continuation of application No. PCT/CN2014/076426, filed on Apr. 29, 2014.

(30) Foreign Application Priority Data

Oct. 30, 2013   (CN) .......................... 2013 1 0529961

(51) Int. Cl.
G06F 15/16 (2006.01)
H04L 29/08 (2006.01)
H04L 29/06 (2006.01)

(52) U.S. Cl.
CPC ...... H04L 67/1002 (2013.01); H04L 63/0861 (2013.01)

(58) Field of Classification Search
CPC ..... H04L 29/08; H04L 63/0861; H04L 67/10; H04N 21/47214; H04N 21/4415; H04N 21/27; H04N 21/4882; G06F 21/32
See application file for complete search history.

(56) References Cited

U.S. PATENT DOCUMENTS

| 5,790,974 A | 8/1998 | Tognazzini |
| 2003/0061172 A1* | 3/2003 | Robinson ............... G06Q 20/04 705/67 |

(Continued)

FOREIGN PATENT DOCUMENTS

| CN | 101669350 A | 3/2010 |
| CN | 102202271 A | 9/2011 |

(Continued)

OTHER PUBLICATIONS

Partial English Translation and Abstract of Chinese Patent Application No. CN102595075A, Feb. 3, 2015, 4 pages.

(Continued)

*Primary Examiner* — Benjamin M Thieu
(74) *Attorney, Agent, or Firm* — Conley Rose, P.C.

(57) ABSTRACT

A method, a terminal device, and a cloud server are provided for presenting schedule reminder information. The method includes after a second terminal logs in to the cloud server by using a first group account, acquiring schedule information stored in the cloud server, where the schedule information is information that is created by a first user who registers a first personal account, and is transmitted to the cloud server by a first terminal that logs in, by using the first personal account, to the cloud server; when reminder time of the schedule information arrives, acquiring second biometric characteristic information of a second user who is using the second terminal; and when it is determined that the second biometric characteristic information is the same as first biometric characteristic information of the first user, presenting reminder information of the schedule information.

14 Claims, 7 Drawing Sheets

(56) References Cited

U.S. PATENT DOCUMENTS

| | | | |
|---|---|---|---|
| 2004/0015702 A1* | 1/2004 | Mercredi | G06F 21/32 713/182 |
| 2008/0205414 A1 | 8/2008 | Katz et al. | |
| 2013/0133055 A1* | 5/2013 | Ali | H04L 63/0861 726/7 |
| 2013/0218622 A1 | 8/2013 | MacKenzie et al. | |

FOREIGN PATENT DOCUMENTS

| | | | |
|---|---|---|---|
| CN | 102595075 | A | 7/2012 |
| CN | 102915492 | A | 2/2013 |
| CN | 103368828 | A | 10/2013 |
| CN | 103368913 | A | 10/2013 |
| CN | 103561086 | A | 2/2014 |
| TW | 201308223 | A | 2/2013 |
| WO | 2012155387 | A1 | 11/2012 |
| WO | 2013006155 | A1 | 1/2013 |

OTHER PUBLICATIONS

Partial English Translation and Abstract of Chinese Patent Application No. CN103561086A, Dec. 3, 2014, 11 pages.
Foreign Communication From a Counterpart Application, PCT Application No. PCT/CN2014/076426, International Search Report dated Aug. 5, 2014, 7 pages.
Foreign Communication From a Counterpart Application, PCT Application No. PCT/CN2014/076426, Written Opinion dated Aug. 5, 2014, 5 pages.
Partial English Translation and Abstract of Chinese Patent Application No. CN102202271, May 10, 2016, 19 pages.
Foreign Communication From a Counterpart Application, Chinese Application No. 201310529961.7, Chinese Office Action dated Apr. 1, 2016, 11 pages.
Foreign Communication From a Counterpart Application, European Application No. 14789970.2, Extended European Search Report dated Aug. 14, 2015, 9 pages.
Partial English Translation and Abstract of Chinese Patent Application No. CN102915492, Jan. 11, 2017, 17 pages.
Foreign Communication From a Counterpart Application, Chinese Application No. 201310529961.7, Chinese Office Action dated Dec. 9, 2016, 10 pages.

* cited by examiner

After a first terminal logs in to a cloud server by using a first personal account, the cloud server acquires schedule information transmitted by the first terminal, where the schedule information is created by a first user ⸺111

After a second terminal logs in to the cloud server by using a first group account, the cloud server determines, according to a correspondence between a personal account and a group account, that the first group account is associated with the first personal account ⸺112

The cloud server transmits the schedule information to the second terminal, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information ⸺113

FIG. 1B

METHOD FOR PRESENTING SCHEDULE REMINDER INFORMATION, TERMINAL DEVICE, AND CLOUD SERVER

CROSS-REFERENCE TO RELATED APPLICATIONS

This application is a continuation of International Application No. PCT/CN2014/076426, filed on Apr. 29, 2014, which claims priority to Chinese Patent Application No. 201310529961.7, filed on Oct. 30, 2013, both of which are hereby incorporated by reference in their entireties.

TECHNICAL FIELD

The present invention relates to the field of communications technologies, and in particular, to a method, a terminal device, and a cloud server for presenting schedule reminder information.

BACKGROUND

In the prior art, schedule application software is generally installed on a terminal device. By using the schedule application software, schedule setting and schedule reminder functions may be implemented, so that a terminal user arranges and handles tedious daily matters. With popularization of terminal devices especially mobile terminals, everyone may use multiple mobile terminals (for example, mobile phones and tablet computers) at the same time. When a terminal user completes a schedule setting on a mobile terminal, the schedule setting may be synchronized to another terminal device that is associated with the terminal user, so that the terminal user may receive a schedule reminder regardless of which terminal device is used.

In a process of research on the prior art, the inventor finds that some terminal devices may be shared by multiple users, for example, a tablet computer, a set top box, and a smart television set may be shared by multiple terminal users A, B, and C. If the terminal user A sets a schedule reminder on a mobile terminal, for example, a mobile phone, but the schedule setting of the terminal user A is not synchronized to these shared terminal devices, the terminal user A cannot obtain the schedule reminder when using these shared terminal devices; however, if the schedule setting of the terminal user A is synchronized to these shared terminal devices, when another terminal user, another terminal user, for example, the terminal user B or the terminal user C, receives the schedule reminder of the terminal user A when using these shared terminal devices, which causes interference to the another user. In this case, the terminal device cannot implement intelligent interaction with the user, and a transaction processing capability of the terminal device is lowered.

SUMMARY

Embodiments of the present invention provide a method, a terminal device, and a cloud server for presenting schedule reminder information, so as to implement intelligent interaction between the terminal device and a user, and improve a transaction processing capability of the terminal device.

To resolve the foregoing technical problem, the embodiments of the present invention disclose the following technical solutions.

According to a first aspect, a method for presenting schedule reminder information is provided, where the method includes logging in, by a second terminal, to a cloud server by using a first group account, where the first group account is an account shared by multiple users; acquiring, by the second terminal, schedule information stored in the cloud server, where the schedule information is information that is created by a first user who registers a first personal account, and is transmitted to the cloud server by a first terminal that logs in, by using the first personal account, to the cloud server, the first personal account is an account uniquely used by the first user, and the first personal account is associated with the first group account; when reminder time of the schedule information arrives, acquiring, by the second terminal, second biometric characteristic information of a second user who is currently using the second terminal; and presenting, by the second terminal, reminder information of the schedule information when it is determined that the second biometric characteristic information is the same as first biometric characteristic information of the first user.

With reference to the first aspect, in a first possible implementation manner of the first aspect, after the logging in, by a second terminal, to a cloud server by using a first group account, the method further includes acquiring, by the second terminal, the first biometric characteristic information that is of the first user, is transmitted by the cloud server, and corresponds to the first personal account; after the acquiring, by the second terminal, schedule information stored in the cloud server, and before the acquiring, by the second terminal, second biometric characteristic information of a second user who is currently using the second terminal, the method further includes storing, by the second terminal, a correspondence between the first biometric characteristic information and the schedule information; and the presenting, by the second terminal, reminder information of the schedule information when it is determined that the second biometric characteristic information is the same as first biometric characteristic information of the first user includes searching, by the second terminal, for the correspondence and obtaining the first biometric characteristic information corresponding to the schedule information; identifying, by the second terminal, whether the second biometric characteristic information is the same as the first biometric characteristic information; and presenting, by the second terminal, the reminder information of the schedule information when an identification result is that the second biometric characteristic information is the same as the first biometric characteristic information.

With reference to the first aspect, in a second possible implementation manner of the first aspect, after the acquiring, by the second terminal, schedule information stored in the cloud server, and before the acquiring, by the second terminal, second biometric characteristic information of a second user who is currently using the second terminal, the method further includes storing, by the second terminal, a correspondence between the first personal account and the schedule information; when the reminder time of the schedule information arrives, the method further includes searching, by the second terminal, for the correspondence and obtaining the first personal account corresponding to the schedule information; and sending, by the second terminal, the first personal account and the second biometric characteristic information to the cloud server; and the presenting, by the second terminal, reminder information of the schedule information when it is determined that the second biometric characteristic information is the same as first biometric characteristic information of the first user includes receiving, by the second terminal, an identification result returned by the cloud server, where the identification result is an identification result obtained, after acquiring, according to a stored correspondence between biometric characteristic information and a personal account, the first biometric characteristic information that is of the first user and corresponds to the first personal account, by the cloud server by identifying whether the second biometric characteristic information is the same as the first biometric characteristic information and presenting, by the second terminal, the reminder information of the schedule information when the identification result is that the second biometric characteristic information is the same as the first biometric characteristic information.

With reference to the first aspect, or the first possible implementation manner of the first aspect, or the second possible implementation manner of the first aspect, in a third possible implementation manner of the first aspect, the method further includes ignoring, by the second terminal, the reminder information of the schedule information when it is determined that the second biometric characteristic information is different from the first biometric characteristic information of the first user.

According to a second aspect, a method for presenting schedule reminder information is provided, where the method includes after a first terminal logs in to a cloud server by using a first personal account, acquiring, by the cloud server, schedule information transmitted by the first terminal, where the schedule information is created by a first user, and the first personal account is an account uniquely used by the first user; after a second terminal logs in to the cloud server by using a first group account, determining, by the cloud server according to a correspondence between a personal account and a group account, that the first group account is associated with the first personal account, where the first group account is an account shared by multiple users; and transmitting, by the cloud server, the schedule information to the second terminal, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information.

With reference to the second aspect, in a first possible implementation manner of the second aspect, before the acquiring, by the cloud server, schedule information transmitted by the first terminal, the method further includes storing, by the cloud server, a personal account and a group account that are created by a user and the correspondence between a personal account and a group account, where each group account is associated with at least one personal account; and storing, by the cloud server, a correspondence between biometric characteristic information of the user who creates the personal account and the personal account.

With reference to the first possible implementation manner of the second aspect, in a second possible implementation manner of the second aspect, after the determining, by the cloud server according to a correspondence between a personal account and a group account, that the first group account is associated with the first personal account, the method further includes searching, by the cloud server, the correspondence between the biometric characteristic information and the personal account and obtaining the first biometric characteristic information that is of the first user and corresponds to the first personal account; and transmitting, by the cloud server, the first biometric characteristic information to the second terminal, so that the second terminal stores, after obtaining the schedule information, a correspondence between the first biometric characteristic information and the schedule information, searches, when the reminder time of the schedule information arrives, for the first biometric characteristic information corresponding to the schedule information, and when it is identified that the second biometric characteristic information is the same as the first biometric characteristic information, presents the reminder information of the schedule information.

With reference to the first possible implementation manner of the second aspect, in a third possible implementation manner of the second aspect, after the transmitting, by the cloud server, the schedule information to the second terminal, the method further includes receiving, by the cloud server, the first personal account and the second biometric characteristic information that are transmitted to the cloud server by the second terminal after the second terminal acquires the second biometric characteristic information, where the first personal account is a personal account that corresponds to the schedule information and is obtained by the second terminal by searching, when the reminder time of the schedule information arrives, for a stored correspondence between a personal account and schedule information; obtaining, by the cloud server according to the correspondence between the biometric characteristic information and the personal account, the first biometric characteristic information corresponding to the first personal account; identifying whether the second biometric characteristic information is the same as the first biometric characteristic information, and obtaining an identification result; and transmitting the identification result to the second terminal, so that the second terminal presents the reminder information of the schedule information when the identification result is that the second biometric characteristic information is the same as the first biometric characteristic information.

According to a third aspect, a terminal device is provided, where the terminal device includes a login unit configured to log in to a cloud server by using a first group account, where the first group account is an account shared by multiple users; a first acquiring unit configured to acquire schedule information stored in the cloud server, where the schedule information is information that is created by a first user who registers a first personal account, and is transmitted to the cloud server by a first terminal that logs in, by using the first personal account, to the cloud server, the first personal account is an account uniquely used by the first user, and the first personal account is associated with the first group account; a second acquiring unit configured to, when reminder time of the schedule information that is acquired by the first acquiring unit arrives, acquire second biometric characteristic information of a second user who is currently using the terminal device; and a presenting unit configured to present reminder information of the schedule information when it is determined that the second biometric characteristic information acquired by the second acquiring unit is the same as first biometric characteristic information of the first user.

With reference to the third aspect, in a first possible implementation manner of the third aspect, the terminal device further includes a third acquiring unit configured to, after the login unit logs in to the cloud server by using the first group account, acquire the first biometric characteristic information that is transmitted by the cloud server and corresponds to the first personal account; and a first storing unit configured to store a correspondence between the first biometric characteristic information and the schedule information after the first acquiring unit acquires the schedule information stored in the cloud server; and the presenting unit includes a relationship-searching subunit configured to search for the correspondence stored by the first storing unit and obtain the first biometric characteristic information corresponding to the schedule information; a characteristic identifying subunit configured to identify whether the second biometric characteristic information acquired by the second acquiring unit is the same as the first biometric characteristic information acquired by the third acquiring unit; and a first information presenting subunit configured to present the reminder information of the schedule information when an identification result of the characteristic identifying subunit is that the second biometric characteristic information is the same as the first biometric characteristic information.

With reference to the third aspect, in a second possible implementation manner of the third aspect, the terminal device further includes a second storing unit configured to store a correspondence between the first personal account and the schedule information after the first acquiring unit acquires the schedule information stored in the cloud server; a searching unit configured to, when the reminder time of the schedule information that is acquired by the first acquiring unit arrives, search for the correspondence stored by the second storing unit and obtain the first personal account corresponding to the schedule information; and a sending unit configured to send, after the second acquiring unit acquires the second biometric characteristic information of the second user who is using the terminal device, the first personal account that is obtained by the searching unit and the second biometric characteristic information to the cloud server; and the presenting unit includes a result receiving subunit configured to receive an identification result returned by the cloud server, where the identification result is an identification result obtained, after acquiring, according to a stored correspondence between biometric characteristic information and a personal account, the first biometric characteristic information that is of the first user and corresponds to the first personal account, by the cloud server by identifying whether the second biometric characteristic information is the same as the first biometric characteristic information; and a second information presenting subunit configured to present the reminder information of the schedule information when the identification result received by the result receiving subunit is that the second biometric characteristic information is the same as the first biometric characteristic information.

According to a fourth aspect, a cloud server is provided, where the cloud server includes an acquiring unit configured to, after a first terminal logs in to the cloud server by using a first personal account, acquire schedule information transmitted by the first terminal, where the schedule information is created by a first user, and the first personal account is an account uniquely used by the first user; a determining unit configured to, after a second terminal logs in to the cloud server by using a first group account, determine, according to a correspondence between a personal account and a group account, that the first group account is associated with the first personal account, where the first group account is an account shared by multiple users; and a first transmitting unit configured to, after the determining unit determines that the first group account is associated with the first personal account, transmit the schedule information acquired by the acquiring unit to the second terminal, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information.

With reference to the fourth aspect, in a first possible implementation manner of the fourth aspect, the cloud server further includes a storing unit configured to store a personal account and a group account that are created by a user and the correspondence between a personal account and a group account, where each group account is associated with at least one personal account; and store a correspondence between biometric characteristic information of the user who creates the personal account and the personal account.

With reference to the first possible implementation manner of the fourth aspect, in a second possible implementation manner of the fourth aspect, the cloud server further includes a searching unit configured to, after the determining unit determines that the first group account is associated with the first personal account, search for the correspondence between biometric characteristic information of a user that creates a personal account and the personal account and obtain the first biometric characteristic information that is of the first user and corresponds to the first personal account; and a second transmitting unit configured to transmit the first biometric characteristic information found by the searching unit to the second terminal, so that the second terminal stores, after obtaining the schedule information, a correspondence between the first biometric characteristic information and the schedule information, searches, when the reminder time of the schedule information arrives, for the first biometric characteristic information corresponding to the schedule information, and when it is identified that the second biometric characteristic information is the same as the first biometric characteristic information, presents the reminder information of the schedule information.

With reference to the first possible implementation manner of the fourth aspect, in a third possible implementation manner of the fourth aspect, the cloud server further includes a receiving unit configured to receive the first personal account and the second biometric characteristic information that are transmitted to the cloud server by the second terminal after the second terminal acquires the second biometric characteristic information, where the first personal account is a personal account that corresponds to the schedule information and is obtained by the second terminal by searching, when the reminder time of the schedule information arrives, for a stored correspondence between a personal account and schedule information; an obtaining unit configured to obtain, according to the correspondence, which is stored by the storing unit, between biometric characteristic information of a user that creates a personal account and the personal account, the first biometric characteristic information corresponding to the first personal account that is received by the receiving unit; an identifying unit configured to identify whether the second biometric characteristic information received by the receiving unit is the same as the first biometric characteristic information obtained by the obtaining unit, and obtain an identification result; and a third transmitting unit configured to transmit the identification result of the identifying unit to the second terminal, so that the second terminal presents the reminder information of the schedule information when the identification result is that the second biometric characteristic information is the same as the first biometric characteristic information.

According to a fifth aspect, a terminal device is provided, where the terminal device includes a network interface and a processor, where the network interface is configured to enable the terminal device to log in to a cloud server by using a first group account; and the processor is configured to acquire, through the network interface, schedule information stored in the cloud server, where the schedule information is information that is created by a first user who registers a first personal account, and is transmitted to the cloud server by a first terminal that logs in, by using the first personal account, to the cloud server, the first personal account is an account uniquely used by the first user, and the first personal account is associated with the first group account; when reminder time of the schedule information arrives, acquire second biometric characteristic information of a second user who is currently using a second terminal; and when it is determined that the second biometric characteristic information is the same as first biometric characteristic information of the first user, present reminder information of the schedule information.

With reference to the fifth aspect, in a first possible implementation manner of the fifth aspect, the terminal device further includes a memory, where the processor is further configured to, after the network interface logs in to the cloud server by using the first group account, acquire, through the network interface, the first biometric characteristic information that is of the first user, is transmitted by the cloud server, and corresponds to the first personal account, and after acquiring, through the network interface, the schedule information stored in the cloud server, store a correspondence between the first biometric characteristic information and the schedule information to the memory; and the processor is configured to search for the correspondence, acquire the first biometric characteristic information corresponding to the schedule information, identify whether the second biometric characteristic information is the same as the first biometric characteristic information, and when an identification result is that the second biometric characteristic information is the same as the first biometric characteristic information, present the reminder information of the schedule information.

With reference to the fifth aspect, in a second possible implementation manner of the fifth aspect, the terminal device further includes a memory, where the processor is further configured to, after acquiring, through the network interface, the schedule information stored in the cloud server, store a correspondence between the first personal account and the schedule information to the memory, search, when the reminder time of the schedule information arrives, for the correspondence and obtain the first personal account corresponding to the schedule information, and send the first personal account and the second biometric characteristic information through the network interface to the cloud server; and the processor is configured to receive, through the network interface, an identification result returned by the cloud server, and when the identification result is that the second biometric characteristic information is the same as the first biometric characteristic information, present the reminder information of the schedule information, where the identification result is an identification result that is obtained, after acquiring, according to a stored correspondence between biometric characteristic information and a personal account, the first biometric characteristic information that is of the first user and corresponds to the first personal account, by the cloud server by identifying whether the second biometric characteristic information is the same as the first biometric characteristic information.

According to a sixth aspect, a cloud server is provided, where the cloud server includes a network interface and a processor, where the network interface is configured to, after a first terminal logs in to the cloud server by using a first personal account, enable the cloud server to acquire schedule information transmitted by the first terminal, where the schedule information is created by a first user, and the first personal account is an account uniquely used by the first user; the processor is configured to, after a second terminal logs in to the cloud server by using a first group account, determine, according to a correspondence between a personal account and a group account, that the first group account is associated with the first personal account, where the first group account is an account shared by multiple users; and transmit the schedule information to the second terminal through the network interface, so that the second terminal acquires, when reminder time of the schedule information arrives, second biometric characteristic information of a second user who is currently using the second terminal, and when it is determined that the second biometric characteristic information is the same as first biometric characteristic information of the first user, present reminder information of the schedule information.

With reference to the sixth aspect, in a first possible implementation manner of the sixth aspect, the cloud server further includes a memory configured to store a personal account and a group account that are created by a user and the correspondence between a personal account and a group account, where each group account is associated with at least one personal account; and store a correspondence between biometric characteristic information of the user who creates the personal account and the personal account.

With reference to the first possible implementation manner of the sixth aspect, in a second possible implementation manner of the sixth aspect, the processor is further configured to, after it is determined that the first group account is associated with the first personal account, search for the correspondence between the biometric characteristic information and the personal account, obtain the first biometric characteristic information that is of the first user and corresponds to the first personal account, and transmit the first biometric characteristic information to the second terminal, so that the second terminal stores, after obtaining the schedule information, a correspondence between the first biometric characteristic information and the schedule information, searches, when the reminder time of the schedule information arrives, for the first biometric characteristic information corresponding to the schedule information, and when it is identified that the second biometric characteristic information is the same as the first biometric characteristic information, presents the reminder information of the schedule information.

With reference to the first possible implementation manner of the sixth aspect, in a third possible implementation manner of the sixth aspect, the network interface is further configured to receive the first personal account and the second biometric characteristic information that are transmitted to the cloud server by the second terminal after the second terminal acquires the second biometric characteristic information, where the first personal account is a personal account that corresponds to the schedule information and is obtained by the second terminal by searching, when the reminder time of the schedule information arrives, for a stored correspondence between a personal account and schedule information; and the processor is further configured to obtain, according to the correspondence between the biometric characteristic information and the personal account, the first biometric characteristic information corresponding to the first personal account, identify whether the second biometric characteristic information is the same as the first biometric characteristic information and obtain an identification result, and transmit the identification result to the second terminal, so that the second terminal presents the reminder information of the schedule information when the identification result is that the second biometric characteristic information is the same as the first biometric characteristic information.

In embodiments of the present invention, after logging in to a cloud server by using a first group account, a second terminal acquires schedule information stored in the cloud server, where the schedule information is information that is created by a first user who registers a first personal account, and is transmitted to the cloud server by a first terminal that logs in, by using the first personal account, to the cloud server; when reminder time of the schedule information arrives, the second terminal acquires second biometric characteristic information of a second user who is using the second terminal; and when it is determined that the second biometric characteristic information is the same as first biometric characteristic information of the first user, the second terminal presents reminder information of the schedule information. By applying the embodiments of the present invention, schedule information of a user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 1B is a flowchart of another embodiment of a method for presenting schedule reminder information according to the present invention;

DETAILED DESCRIPTION

To enable a person skilled in the art to better understand technical solutions in embodiments of the present invention, and make the foregoing purposes, features, and advantages of the embodiments of the present invention clearer and more comprehensible, the following describes the technical solutions of the embodiments of the present invention in more detail with reference to accompanying drawings.

The terms used in the embodiments of the present invention are merely for a purpose of describing a specific embodiment, and are not intended to limit the present invention. The terms "a" and "the" of singular forms used in the embodiments and the appended claims of the present invention are also intended to include plural forms, unless otherwise specified in a context clearly. It should also be understood that, the term "and/or" used herein indicates and includes any or all possible combinations of one or more associated listed items.

It should be understood that although terms "first", "second", "third" and the like may be used in the embodiments of the present invention to describe various information, the information is not limited by the terms. These terms are used merely to differentiate information of a same type. For example, without departing from the scope of the embodiments of the present invention, first biometric characteristic information may also be referred to as second biometric characteristic information, and similarly the second biometric characteristic information may also be referred to as the first biometric characteristic information.

Depending on the context, as used herein, the word "if" may be construed as "at the time of . . . " or "when . . . " or "in response to determining" or "in response to detecting". Similarly, depending on the context, the phrase "if it is determined" may be construed as "when determining" or "in response to determining".

Figure 1A:
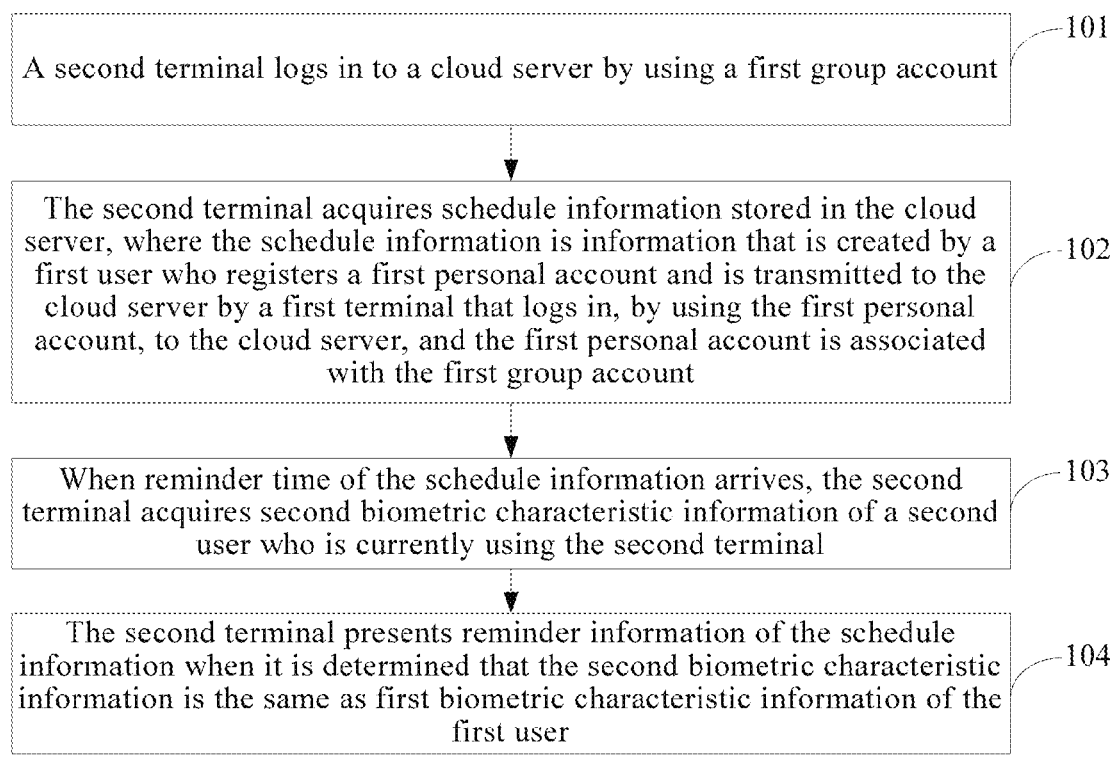
FIG. 1A is a flowchart of an embodiment of a method for presenting schedule reminder information according to the present invention.

Refer to FIG. 1A, which is a flowchart of an embodiment of a method for presenting schedule reminder information according to the present invention. This embodiment describes a process of presenting schedule reminder information from a perspective of a second terminal side, which serves as a shared terminal that is logged in to by using a group account.

Step 101: A second terminal logs in to a cloud server by using a first group account.

In this embodiment of the present invention, the group account is an account shared by multiple users, for example, users A, B, and C may all log in to the second terminal by using the first group account.

Step 102: The second terminal acquires schedule information stored in the cloud server, where the schedule information is information that is created by a first user who registers a first personal account and is transmitted to the cloud server by a first terminal that logs in, by using the first personal account, to the cloud server, and the first personal account is associated with the first group account.

In this embodiment of the present invention, a personal account is an account that is uniquely used by a user who creates the personal account. To ensure that an account is uniquely used by a user, the account may be biometric characteristic information of the user, for example, a face image, fingerprint information, voiceprint information, and the like of the user.

Step 103: When reminder time of the schedule information arrives, the second terminal acquires second biometric characteristic information of a second user who is currently using the second terminal.

In this embodiment of the present invention, the second terminal may acquire the second biometric characteristic information of the second user in real time when the reminder time of the schedule information arrives; the second terminal may also store the second biometric characteristic information of the second user when the second user uses the second terminal for the first time, and acquire the stored second biometric characteristic information when the reminder time of the schedule information arrives.

Step 104: The second terminal presents reminder information of the schedule information when it is determined that the second biometric characteristic information is the same as first biometric characteristic information of the first user.

In this embodiment of the present invention, the second terminal may present the reminder information of the schedule information in multiple manners. For example, when detecting that a user is viewing a screen of the second terminal (specifically, whether a user is viewing a screen of the second terminal may be determined based on whether a face image of the user is photographed by a camera), the second terminal displays the reminder information of the schedule information in a specified position of the screen. For another example, when detecting that a user is holding the second terminal with a hand (specifically, a fingerprint reader that is set in the second terminal may be used to detect whether a user is holding the second terminal with a hand), the second terminal plays the reminder information of the schedule information by using a speaker of the second terminal. It should be noted that, the embodiments of the present invention include but are not limited to the foregoing manners of presenting reminder information.

In an optional implementation manner of this embodiment:

After logging in to the cloud server by using the first group account, the second terminal may acquire the first biometric characteristic information that is transmitted by the cloud server and corresponds to the first personal account; and after acquiring the schedule information stored in the cloud server, the second terminal stores a correspondence between the first biometric characteristic information and the schedule information. Accordingly, the second terminal may search for the stored correspondence, obtain the first biometric characteristic information corresponding to the schedule information, identify whether the second biometric characteristic information of the second user is the same as the first biometric characteristic information, and when an identification result is that the second biometric characteristic information is the same as the first biometric characteristic information, present the reminder information of the schedule information.

In another optional implementation manner of this embodiment:

After acquiring the schedule information stored in the cloud server, the second terminal may store a correspondence between the first personal account and the schedule information. When the reminder time of the schedule information arrives, the second terminal may search for the stored correspondence, obtain the first personal account corresponding to the schedule information, and after acquiring the second biometric characteristic information of the second user who is using the second terminal, send the first personal account and the second biometric characteristic information to the cloud server. Accordingly, the second terminal may receive an identification result returned by the cloud server, where the identification result is an identification result obtained by the cloud server by identifying whether the second biometric characteristic information is the same as the first biometric characteristic information after acquiring, according to a stored correspondence between biometric characteristic information and a personal account, the first biometric characteristic information corresponding to the first personal account; and when the identification result is that the second biometric characteristic information is the same as the first biometric characteristic information, present the reminder information of the schedule information.

Further, when it is determined that the second biometric characteristic information is different from the first biometric characteristic information of the first user, the second terminal may ignore the reminder information of the schedule information, that is, does not present the reminder information.

It can be learned from the foregoing embodiment that, in this embodiment, schedule information of a personal user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

Refer to FIG. 1B, which is a flowchart of another embodiment of a method for presenting schedule reminder information according to the present invention. This embodiment is described from a perspective of a server side.

Step 111: After a first terminal logs in to a cloud server by using a first personal account, the cloud server acquires schedule information transmitted by the first terminal, where the schedule information is created by a first user.

In this embodiment of the present invention, a personal account is an account that is uniquely used by a user who creates the personal account. To ensure that an account is uniquely used by a user, the account may be biometric characteristic information of the user, for example, a face image, fingerprint information, voiceprint information, and the like of the user.

Step 112: After a second terminal logs in to the cloud server by using a first group account, the cloud server determines, according to a correspondence between a personal account and a group account, that the first group account is associated with the first personal account.

In this embodiment of the present invention, a group account is an account shared by multiple users, for example, users A, B, and C may all log in to the second terminal by using the first group account.

Step 113: The cloud server transmits the schedule information to the second terminal, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information.

It can be learned from the foregoing embodiment that, in this embodiment, schedule information of a personal user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

Figure 2:
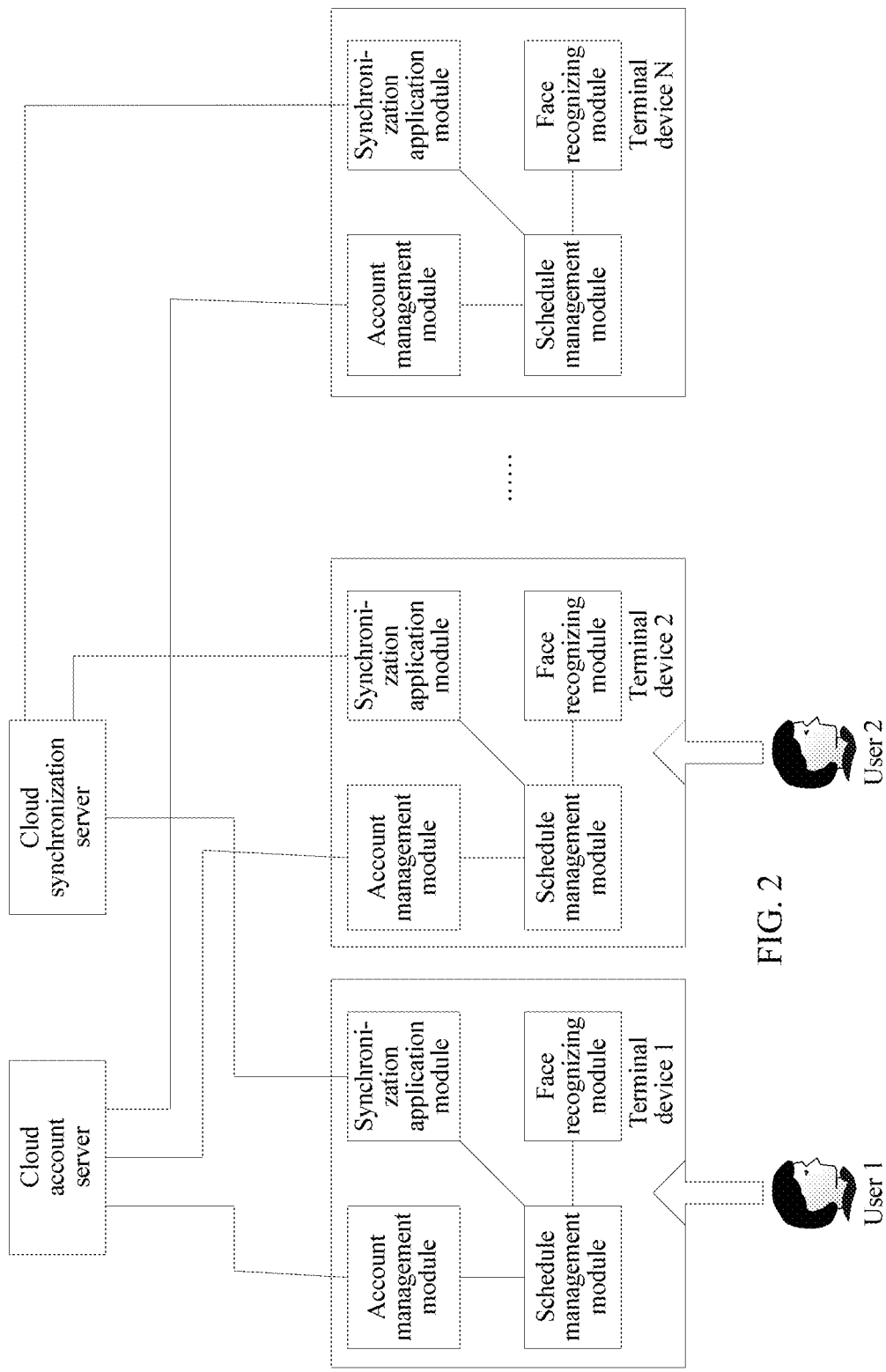
FIG. 2 is a schematic diagram of an application architecture according to an embodiment of the present invention.

Refer to FIG. 2, which is a schematic diagram of an application architecture according to an embodiment of the present invention.

The application architecture in FIG. 2 includes a cloud account server, a cloud synchronization server, and N terminal devices that separately connect to the cloud account server and the cloud synchronization server, which are recorded as terminal device 1, terminal device 2, . . . , terminal device N, where N is a natural number greater than 2. It should be noted that, in FIG. 2, to divide server functions, servers are divided into a cloud account server and a cloud synchronization server. In an actual application, the foregoing two functions may also be integrated into one cloud server, which is not limited in the embodiments of the present invention.

A terminal device in FIG. 2 mainly refers to various intelligent terminals that have a communication function, for example, a smartphone, a personal digital assistant (PDA), a tablet computer, and the like. Each terminal device includes an account management module that communicates with the cloud account server, a synchronization application module that communicates with the cloud synchronization server, a face recognizing module, and a schedule management module that communicates with each of the foregoing three modules. The account management module is configured to log in to the cloud account server by using a personal account or a group account that is registered by a user. The schedule management module is configured to create schedule information of a user who registers a personal account when the account management module logs in to the cloud account server by using the personal account. The synchronization application module is configured to transmit the schedule information created by the schedule management module to the cloud synchronization server, or receive schedule information that is transmitted by the synchronization application module of another terminal device to the cloud synchronization server and transmitted from the cloud synchronization server, and transmit the received schedule information to the schedule management module. The schedule management module is further configured to, when reminder time of the schedule information arrives, directly present reminder information of the schedule information if a query result of a query to the account management module is that a personal account is used for login, and trigger the face recognizing module if the query result of the query to the account management module is that a group account is used for login. The face recognizing module is configured to identify facial information of a user who is using the terminal device, present the reminder information of the schedule information if the facial information of the user who is using the terminal device is the same as facial information of the user who creates the schedule information, and not present the reminder information of the schedule information if the facial information of the user who is using the terminal device is different from the facial information of the user who creates the schedule information.

It should be noted that, a face recognizing module is set in the terminal device in FIG. 2, that is, biometric characteristic information of an application in FIG. 2 is facial information. In an actual application, a voiceprint recognizing module or a fingerprint recognizing module may also be set according to a difference of biometric characteristic information, which is not limited in the embodiments of the present invention.

Figure 3:
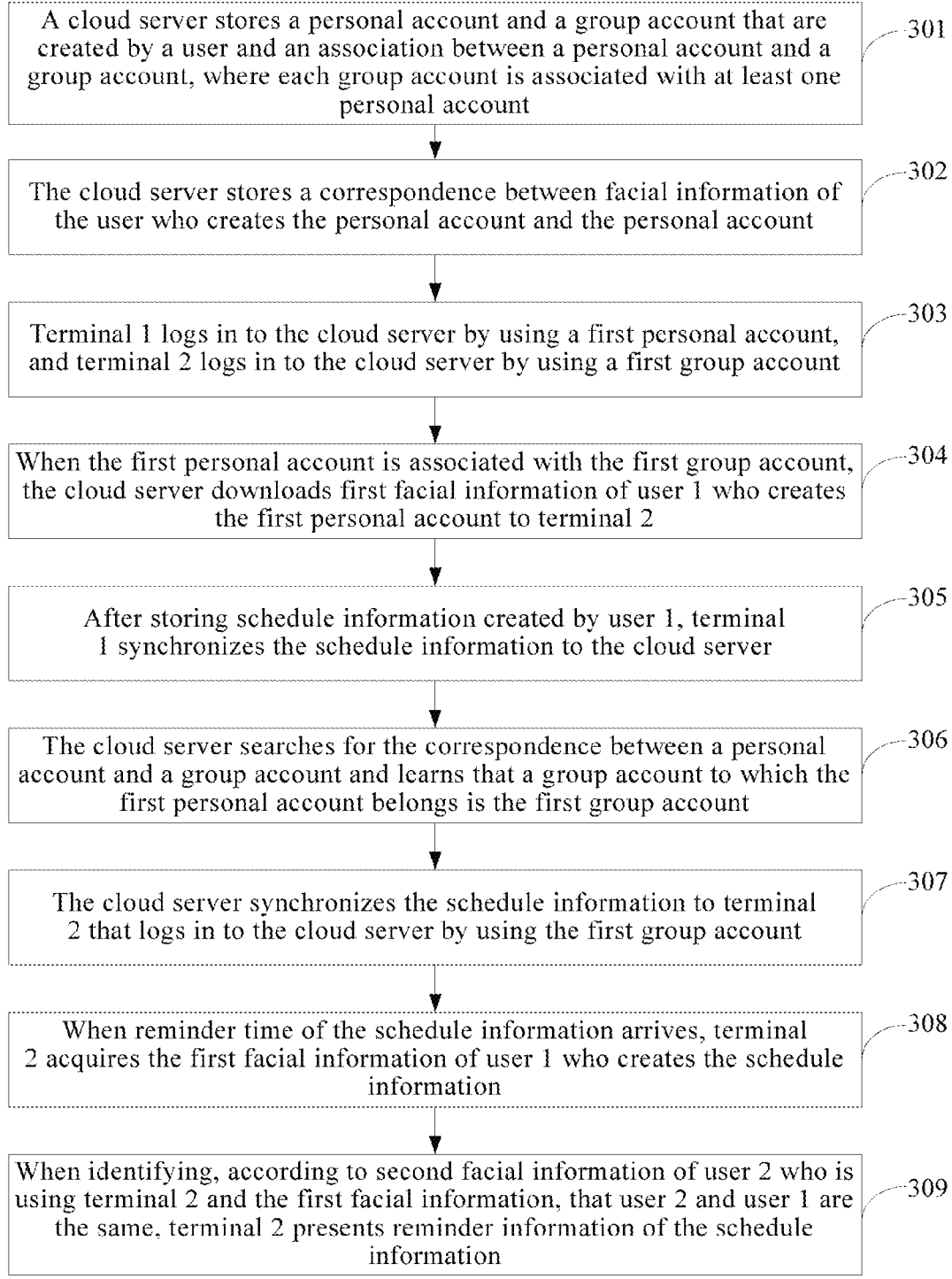
FIG. 3 is a flowchart of another embodiment of a method for presenting schedule reminder information according to the present invention.

Refer to FIG. 3, which is a flowchart of another embodiment of a method for presenting schedule reminder information according to the present invention. In this embodiment, a shared terminal determines, by using locally downloaded facial information, whether to present schedule reminder information.

Step 301: A cloud server stores a personal account and a group account that are created by a user and a correspondence between a personal account and a group account, where each group account is associated with at least one personal account.

With reference to FIG. 2, it is assumed that the user creates a first personal account PrivateAccount1 and a first group account GroupAccount1, and adds PrivateAccount1 to GroupAccount1. At this time, PrivateAccount1 is associated with GroupAccount1 and the cloud server records the foregoing correspondence. A terminal that logs in to the cloud server by using a personal account may be referred to as a personal terminal, and a terminal that logs in to the cloud server by using a group account may be referred to as a shared terminal. In this embodiment, because the correspondence between a personal account and a group account is recorded, when the cloud server is logged in to by using a group account, it is equivalent to that the cloud server is logged in to by using all personal accounts that are associated with the group account.

Step 302: The cloud server stores a correspondence between facial information of the user who creates the personal account and the personal account.

In this embodiment, when the user creates the personal account on the cloud server by using a terminal, a camera that is set on the terminal may be used to capture facial information of the user and send the facial information to the cloud server, and the cloud server stores the correspondence between the personal account created by the user and the facial information of the user.

Step 303: Terminal 1 logs in to the cloud server by using a first personal account, and terminal 2 logs in to the cloud server by using a first group account.

With reference to FIG. 2, it is assumed that user 1 logs in to the cloud server from terminal 1 by using the first personal account PrivateAccount1, and user 2 logs in to the cloud server from terminal 2 by using the first group account GroupAccount1.

Step 304: When the first personal account is associated with the first group account, the cloud server downloads first facial information of user 1 that creates the first personal account to terminal 2.

In this embodiment, after terminal 1 and terminal 2 separately log in to the cloud server, the cloud server determines, by searching for the correspondence between a personal account and a group account, that the first personal account PrivateAccount1 is associated with the first group account GroupAccount1. In this case, the cloud server searches for the correspondence between the facial information and the personal account, obtains the first facial information that is of user 1 and corresponds to PrivateAccount1, and downloads the first facial information of user 1 to terminal 2. Terminal 2 may store a correspondence between the downloaded first facial information and PrivateAccount1. It should be noted that, when multiple other personal accounts that are associated with GroupAccount1 also log in to the cloud server, the cloud server may also download facial information corresponding to these personal accounts to terminal 2 accordingly, so that terminal 2 stores a correspondence between each personal account that is associated with GroupAccount1 and has logged in to the cloud server and the facial information.

Step 305: After storing schedule information created by user 1, terminal 1 synchronizes the schedule information to the cloud server.

It is assumed that user 1 creates the schedule information on terminal 1 by using a schedule management module of terminal 1 and user 1 enables a schedule synchronization function on terminal 1, then terminal 1 may synchronize the schedule information created by user 1 to the cloud server.

Step 306: The cloud server searches for the correspondence between a personal account and a group account and learns that a group account to which the first personal account belongs is the first group account.

In this embodiment, after the cloud server receives the schedule information synchronized by terminal 1, because terminal 1 logs in to the cloud server by using the first personal account PrivateAccount1, the cloud server may learn, by searching for the correspondence between a personal account and a group account, that a group account associated with PrivateAccount1 is GroupAccount1.

Step 307: The cloud server synchronizes the schedule information to terminal 2 that logs in to the cloud server by using the first group account.

After learning that the group account associated with PrivateAccount1 is the first group account GroupAccount1, the cloud server may synchronize the schedule information to all terminals that log in to the cloud server by using GroupAccount1. In this embodiment, the cloud server synchronizes the schedule information to terminal 2 that logs in to the cloud server by using GroupAccount1, and terminal 2 stores a correspondence between the schedule information and the first personal account PrivateAccount1.

Step 308: When reminder time of the schedule information arrives, terminal 2 acquires the first facial information of user 1 who creates the schedule information.

In this embodiment, when the reminder time of the schedule information that is synchronized by terminal 2 arrives, terminal 2, serving as a shared terminal, does not directly present the reminder information. Instead, terminal 2 obtains, by using the correspondence between the schedule information and the personal account, the first personal account PrivateAccount1 that creates the schedule information, and obtains, by using the correspondence between the personal account and facial information, the facial information that is of user 1 and corresponds to the first personal account PrivateAccount1.

In addition, when reminder time of the schedule information on terminal 1 arrives, because terminal 1 logs in to the cloud server by using the personal account PrivateAccount1, terminal 1 may directly present the reminder information of the schedule information to user 1.

Step 309: When identifying, according to second facial information of user 2 who is using terminal 2 and the first facial information, that user 2 and user 1 are the same, terminal 2 presents reminder information of the schedule information.

In this embodiment, terminal 2 may capture, by using a set camera, the second facial information of user 2 who is using terminal 2, and then identifies, by using an existing image recognition technology, whether the second facial information is the same as the first facial information. If the second facial information is the same as the first facial information, it indicates that user 2 and user 1 are the same user and, in this case, terminal 2 may present the reminder information of the schedule information. If the second facial information is different from the first facial information, it indicates that user 2 and user 1 are not the same user and, in this case, terminal 2 may not present the schedule reminder information of the schedule information.

Terminal 2 may present the reminder information of the schedule information in multiple manners. For example, when detecting that a user is viewing a screen of terminal 2 (specifically, whether a user is viewing a screen of terminal 2 may be determined based on whether a face image of the user is photographed by a camera), terminal 2 displays the reminder information of the schedule information in a specified position of the screen. For another example, when detecting that a user is holding terminal 2 with a hand (specifically, a fingerprint reader that is set in terminal 2 may be used to detect whether a user is holding terminal 2 with a hand), terminal 2 plays the reminder information of the schedule information by using a speaker of terminal 2. It should be noted that, the embodiments of the present invention include but are not limited to the foregoing manners of presenting reminder information.

It can be learned from the foregoing embodiment that, in this embodiment, schedule information of a personal user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

Figure 4:
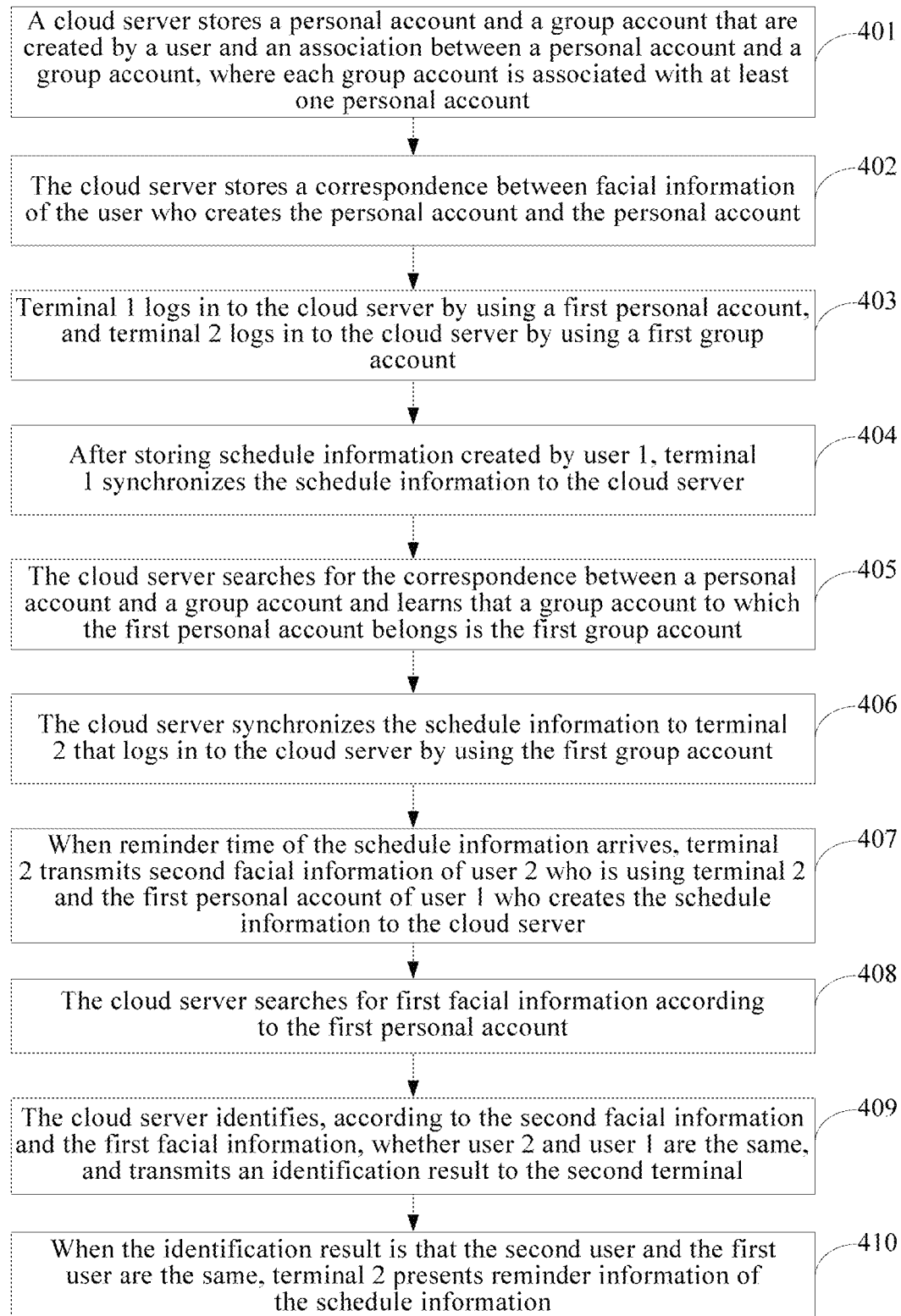
FIG. 4 is a flowchart of another embodiment of a method for presenting schedule reminder information according to the present invention.

Refer to FIG. 4, which is a flowchart of another embodiment of a method for presenting schedule reminder information according to the present invention. In this embodiment, a shared terminal determines, according to an identification result of facial information by a cloud server, whether to present a schedule reminder.

Step 401: The cloud server stores a personal account and a group account that are created by a user and a correspondence between a personal account and a group account, where each group account is associated with at least one personal account.

With reference to FIG. 2, it is assumed that the user creates a first personal account PrivateAccount1 and a first group account GroupAccount1, and adds PrivateAccount1 to GroupAccount1. At this time, PrivateAccount1 is associated with GroupAccount1 and the cloud server records the foregoing correspondence. A terminal that logs in to the cloud server by using a personal account may be referred to as a personal terminal, and a terminal that logs in to the cloud server by using a group account may be referred to as a shared terminal. In this embodiment, because the correspondence between a personal account and a group account is recorded, when the cloud server is logged in to by using a group account, it is equivalent to that the cloud server is logged in to by using all personal accounts that are associated with the group account.

Step 402: The cloud server stores a correspondence between facial information of the user who creates the personal account and the personal account.

In this embodiment, when the user creates the personal account on the cloud server by using a terminal, a camera that is set on the terminal may be used to capture facial information of the user and send the facial information to the cloud server, and the cloud server stores the correspondence between the personal account created by the user and the facial information of the user.

Step 403: Terminal 1 logs in to the cloud server by using a first personal account, and terminal 2 logs in to the cloud server by using a first group account.

With reference to FIG. 2, it is assumed that user 1 logs in to the cloud server from terminal 1 by using the first personal account PrivateAccount1, and user 2 logs in to the cloud server from terminal 2 by using the first group account GroupAccount1.

Step 404: After storing schedule information created by user 1, terminal 1 synchronizes the schedule information to the cloud server.

It is assumed that user 1 creates the schedule information on terminal 1 by using a schedule management module of terminal 1 and user 1 enables a schedule synchronization function on terminal 1, then terminal 1 may synchronize, by using a synchronization application module, the schedule information created by user 1 to the cloud server.

Step 405: The cloud server searches for the correspondence between a personal account and a group account and learns that a group account to which the first personal account belongs is the first group account.

In this embodiment, after the cloud server receives the schedule information synchronized by terminal 1, because terminal 1 logs in to the cloud server by using the first personal account PrivateAccount1, the cloud server may learn, by searching for the correspondence between a personal account and a group account, that a group account associated with PrivateAccount1 is GroupAccount1.

Step 406: The cloud server synchronizes the schedule information to terminal 2 that logs in to the cloud server by using the first group account.

After learning that the group account associated with PrivateAccount1 is the first group account GroupAccount1, the cloud server may synchronize the schedule information to all terminals that log in to the cloud server by using GroupAccount1. In this embodiment, the cloud server synchronizes the schedule information to terminal 2 that logs in to the cloud server by using GroupAccount1, and terminal 2 stores a correspondence between the schedule information and the first personal account PrivateAccount1.

Step 407: When reminder time of the schedule information arrives, terminal 2 transmits second facial information of user 2 who is using terminal 2 and the first personal account of user 1 who creates the schedule information to the cloud server.

In this embodiment, when the reminder time of the schedule information that is synchronized by terminal 2 arrives, terminal 2, serving as a shared terminal, does not directly present the reminder information. Instead, terminal 2 captures, by using a set camera, the second facial information of user 2 who is using terminal 2, and obtains, by using the correspondence between the schedule information and the personal account, the first personal account PrivateAccount1 that creates the schedule information. Then terminal 2 transmits the second facial information and PrivateAccount1 to the cloud server.

Step 408: The cloud server searches for first facial information according to the first personal account.

After receiving the second facial information and PrivateAccount1, the cloud server obtains, by searching for the correspondence between facial information and the personal account, the first facial information that is of user 1 and corresponds to PrivateAccount1.

Step 409: The cloud server identifies, according to the second facial information and the first facial information, whether user 2 and user 1 are the same, and transmits an identification result to the terminal 2.

In this embodiment, the cloud server may identify, by using an existing image recognition technology, whether the second facial information is the same as the first facial information, and transmit the identification result to the second terminal.

Step 410: When the identification result is that the user 2 and the user 1 are the same, terminal 2 presents reminder information of the schedule information.

After receiving the identification result, terminal 2 checks the identification result. If the identification result is that the second facial information is the same as the first facial information, it indicates that user 2 and user 1 are the same user and, in this case, terminal 2 may present the reminder information of the schedule information. If the second facial information is different from the first facial information, it indicates that user 2 and user 1 are not the same user and, in this case, terminal 2 may not present the schedule reminder information.

Terminal 2 may present the reminder information of the schedule information in multiple manners. For example, when detecting that a user is viewing a screen of terminal 2 (specifically, whether a user is viewing a screen of terminal 2 may be determined based on whether a face image of the user is photographed by a camera), terminal 2 displays the reminder information of the schedule information in a specified position of the screen. For another example, when detecting that a user is holding terminal 2 with a hand (specifically, a fingerprint reader that is set in terminal 2 may be used to detect whether a user is holding terminal 2 with a hand), terminal 2 plays the reminder information of the schedule information by using a speaker of terminal 2. It should be noted that, the embodiments of the present invention include but are not limited to the foregoing manners of presenting reminder information.

It can be learned from the foregoing embodiment that, in this embodiment, schedule information of a personal user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

Corresponding to the embodiments of a method for presenting schedule reminder information provided in the present invention, the present invention further provides embodiments of a terminal device and a cloud server.

Figure 5:
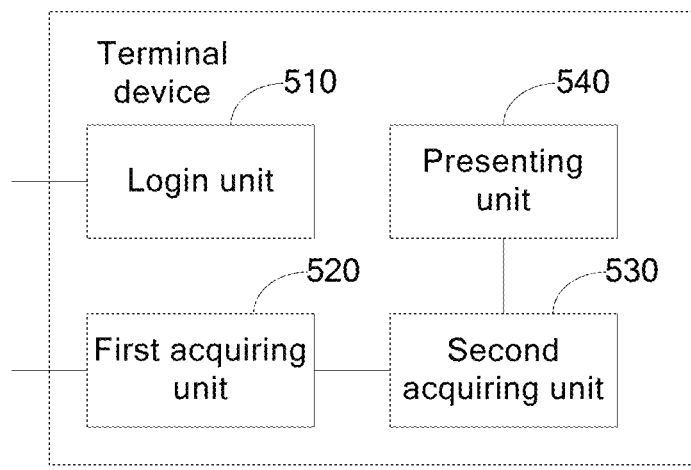
FIG. 5 is a block diagram of an embodiment of a terminal device according to the present invention.

Refer to FIG. 5, which is a block diagram of an embodiment of a terminal device according to the present invention.

The terminal device includes a login unit 510, a first acquiring unit 520, a second acquiring unit 530, and a presenting unit 540.

The login unit 510 is configured to log in to a cloud server by using a first group account, where the first group account is an account shared by multiple users.

The first acquiring unit 520 is configured to acquire schedule information stored in the cloud server, where the schedule information is information that is created by a first user who registers a first personal account, and is transmitted to the cloud server by a first terminal that logs in, by using the first personal account, to the cloud server, the first personal account is an account uniquely used by the first user, and the first personal account is associated with the first group account.

The second acquiring unit 530 is configured to, when reminder time of the schedule information that is acquired by the first acquiring unit 520 arrives, acquire second biometric information of a second user who is currently using the terminal device.

The presenting unit 540 is configured to present reminder information of the schedule information when it is determined that the second biometric characteristic information acquired by the second acquiring unit is the same as first biometric characteristic information of the first user.

In an optional implementation manner, the terminal device may further include (not shown in FIG. 5) a third acquiring unit configured to, after the login unit logs in to the cloud server by using the first group account, acquire the first biometric characteristic information that is transmitted by the cloud server and corresponds to the first personal account; and a first storing unit configured to store a correspondence between the first biometric characteristic information and the schedule information after the first acquiring unit acquires the schedule information stored in the cloud server; and accordingly, the presenting unit 540 may include (not shown in FIG. 5) a relationship-searching subunit configured to search for the correspondence stored by the first storing unit and obtain the first biometric characteristic information corresponding to the schedule information; a characteristic identifying subunit configured to identify whether the second biometric characteristic information acquired by the second acquiring unit is the same as the first biometric characteristic information acquired by the third acquiring unit; and a first information presenting subunit configured to present the reminder information of the schedule information when an identification result of the characteristic identifying subunit is that the second biometric characteristic information is the same as the first biometric characteristic information.

In another optional implementation manner, the terminal device may further include (not shown in FIG. 5) a second storing unit configured to store a correspondence between the first personal account and the schedule information after the first acquiring unit acquires the schedule information stored in the cloud server; a searching unit configured to, when the reminder time of the schedule information that is acquired by the first acquiring unit arrives, search for the correspondence stored by the second storing unit and obtain the first personal account corresponding to the schedule information; and a sending unit configured to send, after the second acquiring unit acquires the second biometric characteristic information of the second user who is using the terminal device, the first personal account that is obtained by the searching unit and the second biometric characteristic information to the cloud server; and the presenting unit 540 may include (not shown in FIG. 5) a result receiving subunit configured to receive an identification result returned by the cloud server, where the identification result is an identification result obtained, after acquiring, according to a stored correspondence between biometric characteristic information and a personal account, the first biometric characteristic information that is of the first user and corresponds to the first personal account, by the cloud server by identifying whether the second biometric characteristic information is the same as the first biometric characteristic information; and a second information presenting subunit configured to present the reminder information of the schedule information when the identification result received by the result receiving subunit is that the second biometric characteristic information is the same as the first biometric characteristic information.

Figure 6:
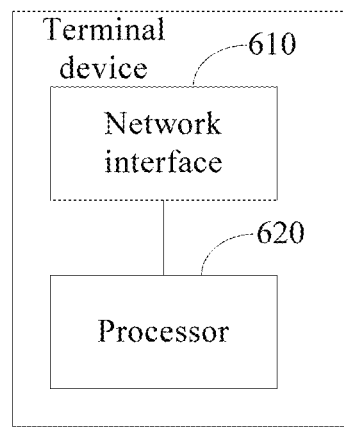
FIG. 6 is a block diagram of another embodiment of a terminal device according to the present invention.

Refer to FIG. 6, which is a block diagram of another embodiment of a terminal device according to the present invention.

The terminal device includes a network interface 610 and a processor 620.

The network interface 610 is configured to log in to a cloud server by using a first group account.

The processor 620 is configured to acquire, through the network interface 610, schedule information stored in the cloud server, where the schedule information is information that is created by a first user who registers a first personal account, and is transmitted to the cloud server by a first terminal that logs in, by using the first personal account, to the cloud server, the first personal account is an account uniquely used by the first user, and the first personal account is associated with the first group account; and when reminder time of the schedule information arrives, acquire second biometric characteristic information of a second user who is currently using a second terminal, and when it is determined that the second biometric characteristic information is the same as first biometric characteristic information of the first user, present reminder information of the schedule information.

In an optional implementation manner, the terminal device may further include a memory (not shown in FIG. 6); the processor 620 may be further configured to, after the network interface 610 logs in to the cloud server by using the first group account, acquire, through the network interface, the first biometric characteristic information that is of the first user, is transmitted by the cloud server, and corresponds to the first personal account, and after acquiring, through the network interface 610, the schedule information stored in the cloud server, store a correspondence between the first biometric characteristic information and the schedule information to the memory; and the processor 620 may be configured to search for the correspondence, acquire the first biometric characteristic information corresponding to the schedule information, identify whether the second biometric characteristic information is the same as the first biometric characteristic information, and when an identification result is that the second biometric characteristic information is the same as the first biometric characteristic information, present the reminder information of the schedule information.

In another optional implementation manner, the terminal device may further include a memory (not shown in FIG. 6); the processor 620 may be further configured to, after acquiring, through the network interface, the schedule information stored in the cloud server, store a correspondence between the first personal account and the schedule information to the memory, search, when the reminder time of the schedule information arrives, for the correspondence and obtain the first personal account corresponding to the schedule information, and send the first personal account and the second biometric characteristic information through the network interface to the cloud server; and the processor 620 may be configured to receive, through the network interface, an identification result returned by the cloud server, and when the identification result is that the second biometric characteristic information is the same as the first biometric characteristic information, present the reminder information of the schedule information, where the identification result is an identification result that is obtained, after acquiring, according to a stored correspondence between biometric characteristic information and a personal account, the first biometric characteristic information that is of the first user and corresponds to the first personal account, by the cloud server by identifying whether the second biometric characteristic information is the same as the first biometric characteristic information.

Figure 7:
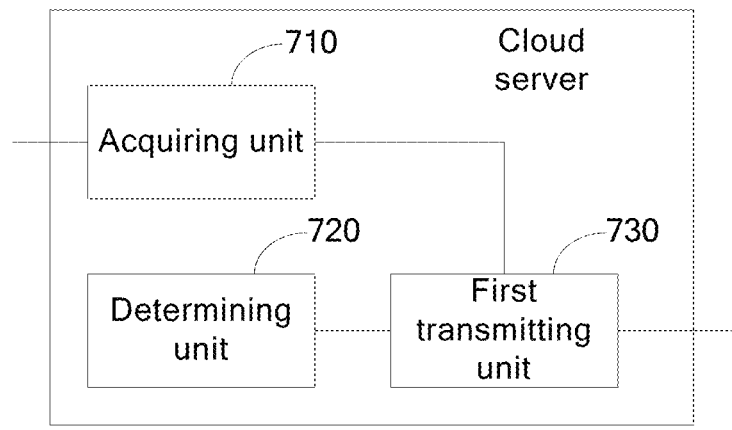
FIG. 7 is a block diagram of an embodiment of a cloud server according to the present invention.

Refer to FIG. 7, which is a block diagram of an embodiment of a cloud server according to the present invention.

The cloud server includes an acquiring unit 710, a determining unit 720, and a first transmitting unit 730.

The acquiring unit 710 is configured to, after a first terminal logs in to the cloud server by using a first personal account, acquire schedule information transmitted by the first terminal, where the schedule information is created by a first user, and the first personal account is an account uniquely used by the first user.

The determining unit 720 is configured to, after a second terminal logs in to the cloud server by using a first group account, determine, according to a correspondence between a personal account and a group account, that the first group account is associated with the first personal account, where the first group account is an account shared by multiple users.

The first transmitting unit 730 is configured to, after the determining unit 720 determines that the first group account is associated with the first personal account, transmit the schedule information acquired by the acquiring unit 710 to the second terminal, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information.

Further, the cloud server may further include (not shown in FIG. 7) a storing unit configured to store a personal account and a group account that are created by a user and the correspondence between a personal account and a group account, where each group account is associated with at least one personal account; and store a correspondence between biometric characteristic information of the user who creates the personal account and the personal account.

In an optional implementation manner, the cloud server may further include (not shown in FIG. 7) a searching unit configured to, after the determining unit determines that the first group account is associated with the first personal account, search for the correspondence between biometric characteristic information of a user that creates a personal account and the personal account and obtain the first biometric characteristic information that is of the first user and corresponds to the first personal account; and a second transmitting unit configured to transmit the first biometric characteristic information found by the searching unit to the second terminal, so that the second terminal stores, after obtaining the schedule information, a correspondence between the first biometric characteristic information and the schedule information, searches, when the reminder time of the schedule information arrives, for the first biometric characteristic information corresponding to the schedule information, and when it is identified that the second biometric characteristic information is the same as the first biometric characteristic information, presents the reminder information of the schedule information.

In another optional implementation manner, the cloud server may further include (not shown in FIG. 7) a receiving unit configured to receive the first personal account and the second biometric characteristic information that are transmitted to the cloud server by the second terminal after the second terminal acquires the second biometric characteristic information, where the first personal account is a personal account that corresponds to the schedule information and is obtained by the second terminal by searching, when the reminder time of the schedule information arrives, for a stored correspondence between a personal account and schedule information; an obtaining unit configured to obtain, according to the correspondence, which is stored by the storing unit, between biometric characteristic information of a user that creates a personal account and the personal account, the first biometric characteristic information corresponding to the first personal account that is received by the receiving unit; an identifying unit configured to identify whether the second biometric characteristic information received by the receiving unit is the same as the first biometric characteristic information obtained by the obtaining unit, and obtain an identification result; and a third transmitting unit configured to transmit the identification result of the identifying unit to the second terminal, so that the second terminal presents the reminder information of the schedule information when the identification result is that the second biometric characteristic information is the same as the first biometric characteristic information.

Figure 8:
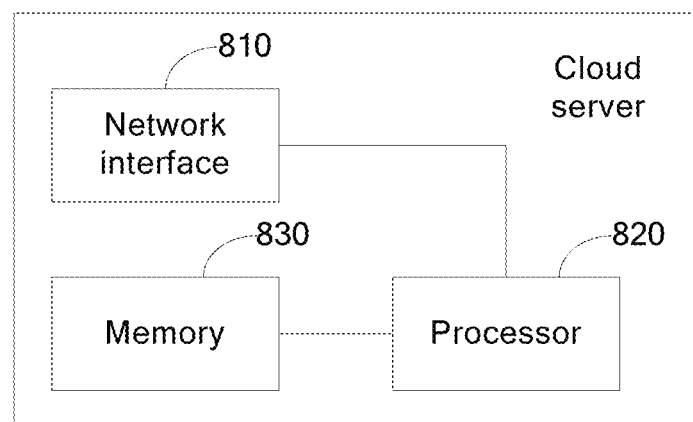
FIG. 8 is a block diagram of another embodiment of a cloud server according to the present invention.

Refer to FIG. 8, which is a block diagram of another embodiment of a cloud server according to the present invention.

The cloud server includes a network interface 810, a processor 820, and a memory 830.

The network interface 810 is configured to, after a first terminal logs in to the cloud server by using a first personal account, acquire schedule information transmitted by the first terminal, where the schedule information is created by a first user, and the first personal account is an account uniquely used by the first user.

The processor 820 is configured to, after a second terminal logs in to the cloud server by using a first group account, determine, according to a correspondence between a personal account and a group account, that the first group account is associated with the first personal account, where the first group account is an account shared by multiple users, and transmit the schedule information to the second terminal through the network interface, so that the second terminal acquires, when reminder time of the schedule information arrives, second biometric characteristic information of a second user who is currently using the second terminal, and when it is determined that the second biometric characteristic information is the same as first biometric characteristic information of the first user, presents reminder information of the schedule information.

Further, the memory 830 is configured to store a personal account and a group account that are created by a user and the correspondence between a personal account and a group account, where each group account is associated with at least one personal account; and store a correspondence between biometric characteristic information of the user who creates the personal account and the personal account.

In an optional implementation manner, the processor 820 may be further configured to, after it is determined that the first group account is associated with the first personal account, search for the correspondence between the biometric characteristic information and the personal account, obtain the first biometric characteristic information that is of the first user and corresponds to the first personal account, and transmit the first biometric characteristic information to the second terminal, so that the second terminal stores, after obtaining the schedule information, a correspondence between the first biometric characteristic information and the schedule information, searches, when the reminder time of the schedule information arrives, for the first biometric characteristic information corresponding to the schedule information, and when it is identified that the second biometric characteristic information is the same as the first biometric characteristic information, presents the reminder information of the schedule information.

In another optional implementation manner, the network interface 810 may be further configured to receive the first personal account and the second biometric characteristic information that are transmitted to the cloud server by the second terminal after the second terminal acquires the second biometric characteristic information, where the first personal account is a personal account that corresponds to the schedule information and is obtained by the second terminal by searching, when the reminder time of the schedule information arrives, for a stored correspondence between a personal account and schedule information; and the processor 820 may be further configured to obtain, according to the correspondence between the biometric characteristic information and the personal account, the first biometric characteristic information corresponding to the first personal account, identify whether the second biometric characteristic information is the same as the first biometric characteristic information and obtain an identification result, and transmit the identification result to the second terminal, so that the second terminal presents the reminder information of the schedule information when the identification result is that the second biometric characteristic information is the same as the first biometric characteristic information.

It can be learned from the foregoing embodiment that, after logging in to a cloud server by using a first group account, a second terminal acquires schedule information stored in the cloud server, where the schedule information is information that is created by a first user who registers a first personal account, and is transmitted to the cloud server by a first terminal that logs in, by using the first personal account, to the cloud server; when reminder time of the schedule information arrives, the second terminal acquires second biometric characteristic information of a second user who is using the second terminal; and when it is determined that the second biometric characteristic information is the same as first biometric characteristic information of the first user, the second terminal presents reminder information of the schedule information. By applying the embodiments of the present invention, schedule information of a personal user may be synchronized to a shared terminal that is logged in to by using a group account, so that the personal user may obtain reminder information of the schedule information when using the shared terminal. In addition, the shared terminal does not directly present the reminder information when reminder time of the schedule information arrives, but presents the reminder information only when it is identified that the user who is using the shared terminal and a user who creates the schedule information are the same user. Therefore, no interference is caused to another user who uses the shared terminal, intelligent interaction between a terminal device and a user is implemented, and a transaction processing capability of the terminal device is improved.

A person skilled in the art may clearly understand that, the technique in the embodiments of the present invention may be implemented through software and a necessary general hardware platform. Based on such an understanding, the technical solutions of the present invention essentially or the part contributing to the prior art may be implemented in a form of a software product. The software product is stored in a storage medium, such as a read-only memory (ROM)/random-access memory (RAM), a magnetic disk, or an optical disc, and includes several instructions for instructing a computer device (which may be a personal computer, a server, or a network device) to perform the methods described in the embodiments or some parts of the embodiments of the present invention.

The embodiments of the present specification are described in a progressive manner. The same or similar parts of the embodiments can be referenced mutually. The focus of each embodiment is placed on a difference from other embodiments. Particularly, for a system embodiment, because it is basically similar to the method embodiment, the system embodiment is described briefly. For the relevant part, refer to the description in the method embodiment.

The foregoing implementation manners of the present invention do not constitute any limitation on the protection scope of the present invention. Any modification, equivalent replacement, and improvement made without departing from the principle of the present invention shall fall within the protection scope of the present invention.

What is claimed is:

1. A method for presenting schedule reminder information, comprising:
   logging in, at a second terminal, to a cloud server by using a first group account, wherein the first group account is an account shared by multiple users;
   receiving, by the second terminal from the cloud server, schedule information and first biometric characteristic information of a first user associated with a first personal account when the first personal account is associated with the first group account, wherein the schedule information and the first biometric characteristic information is first user information associated with the first personal account, and wherein the schedule information and the first biometric characteristic information is received from the cloud server based on a determined association between the first personal account and the first group account;
   storing, by the second terminal, a correspondence between the first biometric characteristic information and the schedule information;
   acquiring, at the second terminal, second biometric characteristic information of a second user currently using the second terminal when a reminder time of the schedule information arrives; and
   presenting, by the second terminal, reminder information associated with the schedule information when the second biometric characteristic information matches the first biometric characteristic information, wherein presenting the reminder information associated with the schedule information comprises:

searching, by the second terminal, for the correspondence and obtaining the first biometric characteristic information corresponding to the schedule information;

identifying, by the second terminal, whether the second biometric characteristic information matches the first biometric characteristic information; and presenting, by the second terminal, the reminder information of the schedule information when the second biometric characteristic information matches the first biometric characteristic information.

2. The method according to claim 1, comprising:

storing, by the second terminal, a second correspondence between the first personal account and the schedule information;

searching, by the second terminal, for the second correspondence and obtaining the first personal account corresponding to the schedule information; and sending, by the second terminal, the first personal account and the second biometric characteristic information to the cloud server, wherein presenting, by the second terminal, the reminder information of the schedule information comprises:

receiving, by the second terminal, an identification result returned by the cloud server that identifies whether the second biometric characteristic information matches the first biometric characteristic information; and presenting, by the second terminal, the reminder information of the schedule information when the second biometric characteristic information matches the first biometric characteristic information.

3. The method according to claim 2, further comprising ignoring, by the second terminal, the reminder information of the schedule information when the second biometric characteristic information is different from the first biometric characteristic information of the first user.

4. A method for presenting schedule reminder information, comprising:

acquiring, by a cloud server, schedule information and first biometric characteristic information of a first user associated with a first personal account from a first terminal, wherein the schedule information and the first biometric characteristic information is first user information associated with the first personal account;

storing, by the cloud server, an association between the first personal account and at least one group account;

storing, by the cloud server, a correspondence between the first biometric characteristic information of the first user and the personal account;

determining, by the cloud server according to the association between the first personal account and at least one of the group accounts, whether a first group account is associated with the first personal account after receiving log-in information with the first group account, wherein the first group account is an account shared by multiple users;

transmitting, by the cloud server, the schedule information and the first biometric characteristic information to a second terminal when the first personal account is associated with the first group account; and transmitting, by the cloud server, reminder information of the schedule information when the first biometric characteristic information matches the second biometric characteristic information.

5. The method according to claim 4, wherein before acquiring, by the cloud server, the schedule information and the first biometric characteristic information of the first user, the method further comprises storing, by the cloud server, the first personal account and the first group account and the association between the first personal account and at least one of the group accounts; and.

6. The method according to claim 5, wherein after determining, by the cloud server according to the correspondence between the first personal account and at least one of the group accounts, that the first group account is associated with the first personal account, the method further comprises:

searching, by the cloud server, the correspondence between the first biometric characteristic information and the first personal account and obtaining the first biometric characteristic information of the first user that corresponds to the first personal account; and transmitting, by the cloud server, the first biometric characteristic information to the second terminal for presenting the reminder information of the schedule information when the first biometric characteristic information matches the second biometric characteristic information.

7. The method according to claim 5, wherein after transmitting, by the cloud server, the schedule information to the second terminal, the method further comprises:

receiving, by the cloud server, the first personal account and the second biometric characteristic information from the second terminal, wherein the first personal account is a personal account that corresponds to the schedule information;

obtaining, by the cloud server, according to the correspondence between the first biometric characteristic information and the first personal account, the first biometric characteristic information corresponding to the first personal account;

identifying, by the cloud server, whether the second biometric characteristic information matches the first biometric characteristic information, and obtaining an identification result; and transmitting, by the cloud server, the identification result to the second terminal for presenting the reminder information of the schedule information when the identification result is that the second biometric characteristic information matches the first biometric characteristic information.

8. A terminal device, comprising:

a processor configured to log in to a cloud server by using a first group account, wherein the first group account is an account shared by multiple users; and a receiver coupled to the processor and configured to:

receive schedule information and first biometric characteristic information of a first user associated with a first personal account from a cloud server when the first personal account is associated with the first group account, wherein the schedule information and the first biometric characteristic information is first user information associated with the first personal account, and wherein the schedule information and the first biometric characteristic information is received from the cloud server based on a determined association between the first personal account and the first group account; and acquire second biometric characteristic information of a second user currently using the terminal device when a reminder time of the schedule information arrives, wherein the processor is further configured to:
store a correspondence between the First biometric characteristic information and the schedule information after receiving the schedule information from the cloud server;
present the reminder information associated with the schedule information when the second biometric characteristic information matches the first biometric characteristic information, wherein the processor is configured to:
search for the correspondence between the first personal account and the first group account and obtain the first biometric characteristic information corresponding to the schedule information;
identify whether the second biometric characteristic information matches the first biometric characteristic information; and
present the reminder information of the schedule information when the second biometric characteristic information matches the first biometric characteristic information.

9. The terminal device according to claim 8, wherein the receiver is further configured to acquire the first biometric characteristic information that is transmitted by the cloud server and corresponds to the first personal account after the processor logs in to the cloud server by using the first group account.

10. The terminal device according to claim 8, wherein the processor is further configured to:
store the correspondence between the first personal account and the schedule information after acquiring the schedule information stored in the cloud server; and
search for the correspondence between the first personal account and the first group account and obtain the first personal account corresponding to the schedule information when the reminder time of the schedule information arrives;
wherein the terminal device further comprises a transmitter coupled to the processor and configured to send the first personal account and the second biometric characteristic information to the cloud server after acquiring the second biometric characteristic information of the second user while using the terminal device, and
wherein the processor is further configured to:
receive an identification result returned by the cloud server, wherein the identification result is an identification result obtained by the cloud server by identifying whether the second biometric characteristic information matches the first biometric characteristic information after acquiring, according to a stored correspondence between biometric characteristic information and a personal account, the first biometric characteristic information of the first user that corresponds to the first personal account; and
present the reminder information of the schedule information when the identification result is that the second biometric characteristic information matches the first biometric characteristic information.

11. A cloud server, comprising:
a processor configured to:
acquire schedule information and first biometric characteristic information of a first user associated with a first personal account from a first terminal, wherein the schedule information and the first biometric characteristic information is first user information associated with the first personal account;
store a correspondence between the first personal account and at least one group account;
store a second correspondence between the first biometric characteristic information of the first user and the first personal account;
determine, according to the stored correspondence between the first personal account and at least one of the group accounts, whether a first group account is associated with the first personal account after receiving log-in information with the first group account, wherein the first group account is an account shared by multiple users; and
a transmitter coupled to the processor and configured to:
transmit the schedule information and the first biometric characteristic information to a second terminal after determining that the first group account is associated with the first personal account; and
present a reminder information of the schedule information when the first biometric characteristic information matches a second biometric characteristic information.

12. The cloud server according to claim 11, wherein the processor is further configured to store a personal account and a group account that are created by a user and the correspondence between the first personal account and the first group account, wherein each group account is associated with at least one personal account.

13. The cloud server according to claim 12, wherein the processor is further configured to search for the correspondence between biometric characteristic information of the first user and the first personal account and obtain the first biometric characteristic information of the first user that corresponds to the first personal account after determining that the first group account is associated with the first personal account; and wherein the transmitter is further configured to transmit the first biometric characteristic information to the second terminal for presenting the reminder information of the schedule information when a reminder time of the schedule information arrives and when the first biometric characteristic information matches the second biometric characteristic information.

14. The cloud server according to claim 12, further comprising:
a receiver coupled to the processor and configured to receive the first personal account and the second biometric characteristic information at the cloud server, wherein the first personal account is the personal account that corresponds to the schedule information and is obtained by the second terminal by searching, when a reminder time of the schedule information arrives, for a stored correspondence between the personal account and schedule information,
wherein the processor is further configured to:
obtain, according to the correspondence, between the first biometric characteristic information and the first personal account, the first biometric characteristic information;

identify whether the second biometric characteristic information matches the first biometric characteristic information; and obtain an identification result;

wherein the transmitter is further configured to transmit the identification result to the second terminal for use in presenting the reminder information of the schedule information when the identification result is that the second biometric characteristic information matches the first biometric characteristic information.

* * * * *

UNITED STATES PATENT AND TRADEMARK OFFICE
CERTIFICATE OF CORRECTION

PATENT NO. : 9,900,376 B2  
APPLICATION NO. : 14/550033  
DATED : February 20, 2018  
INVENTOR(S) : Haizhang Chi It is certified that error appears in the above-identified patent and that said Letters Patent is hereby corrected as shown below:

On the Title Page

Under Applicant should read:
HUAWEI DEVICE (DONGGUAN) CO., LTD., Dongguan (CN)

Signed and Sealed this  
Tenth Day of April, 2018

Andrei Iancu  
*Director of the United States Patent and Trademark Office*